Patented Feb. 4, 1930

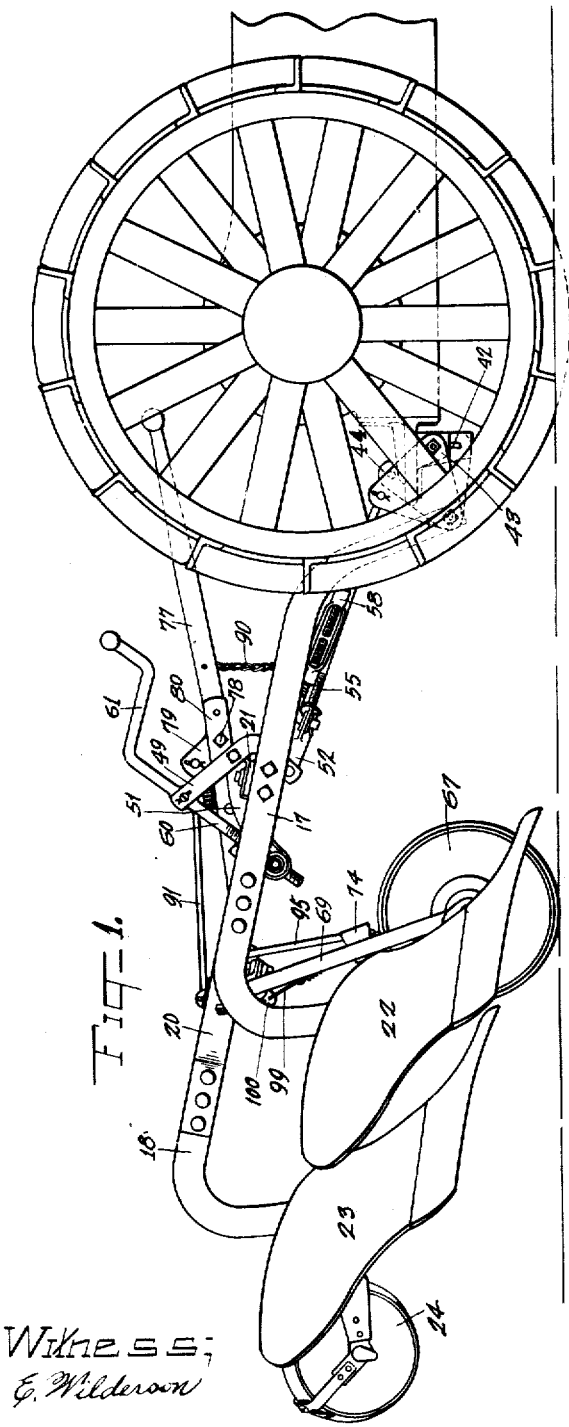

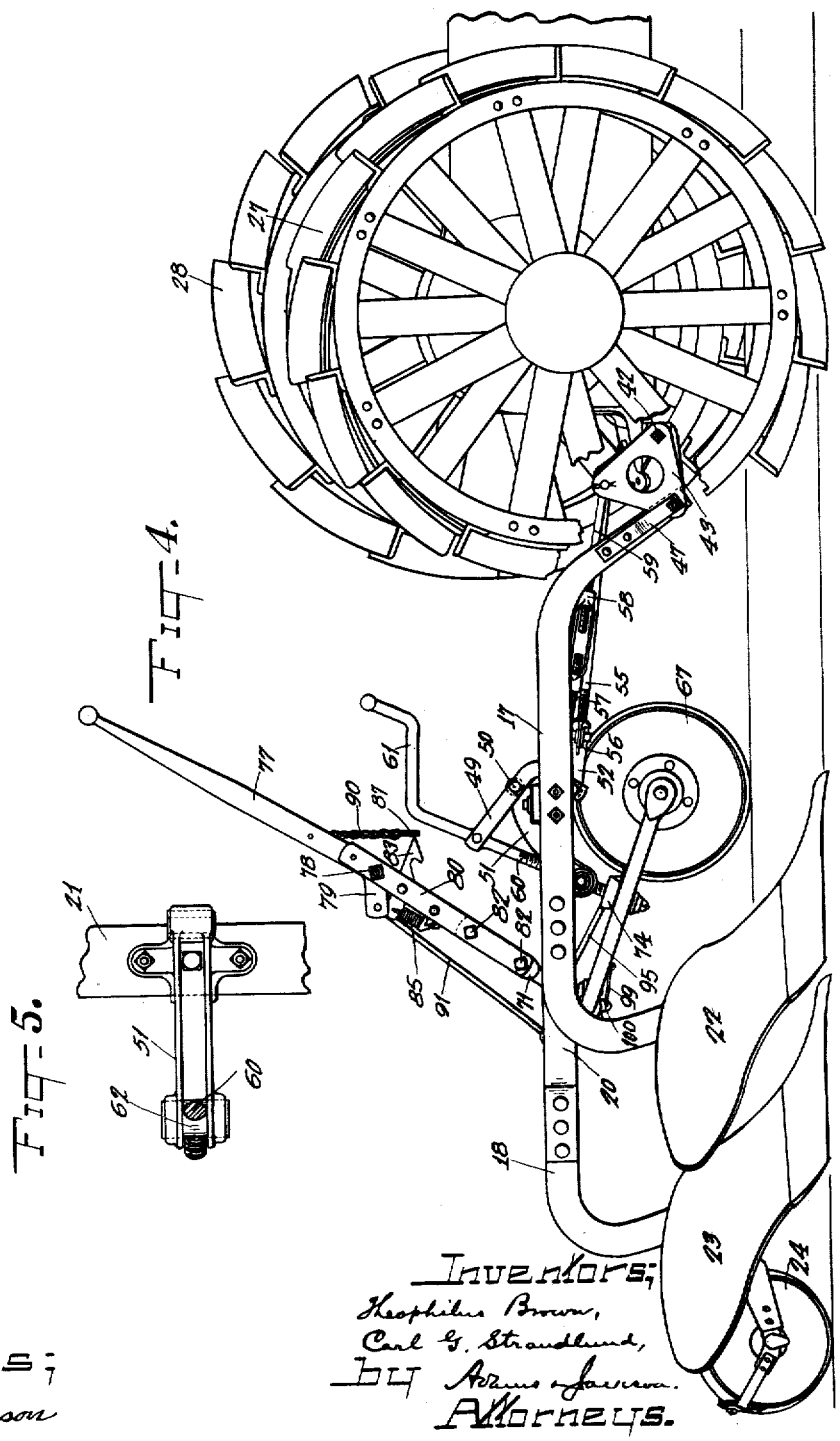

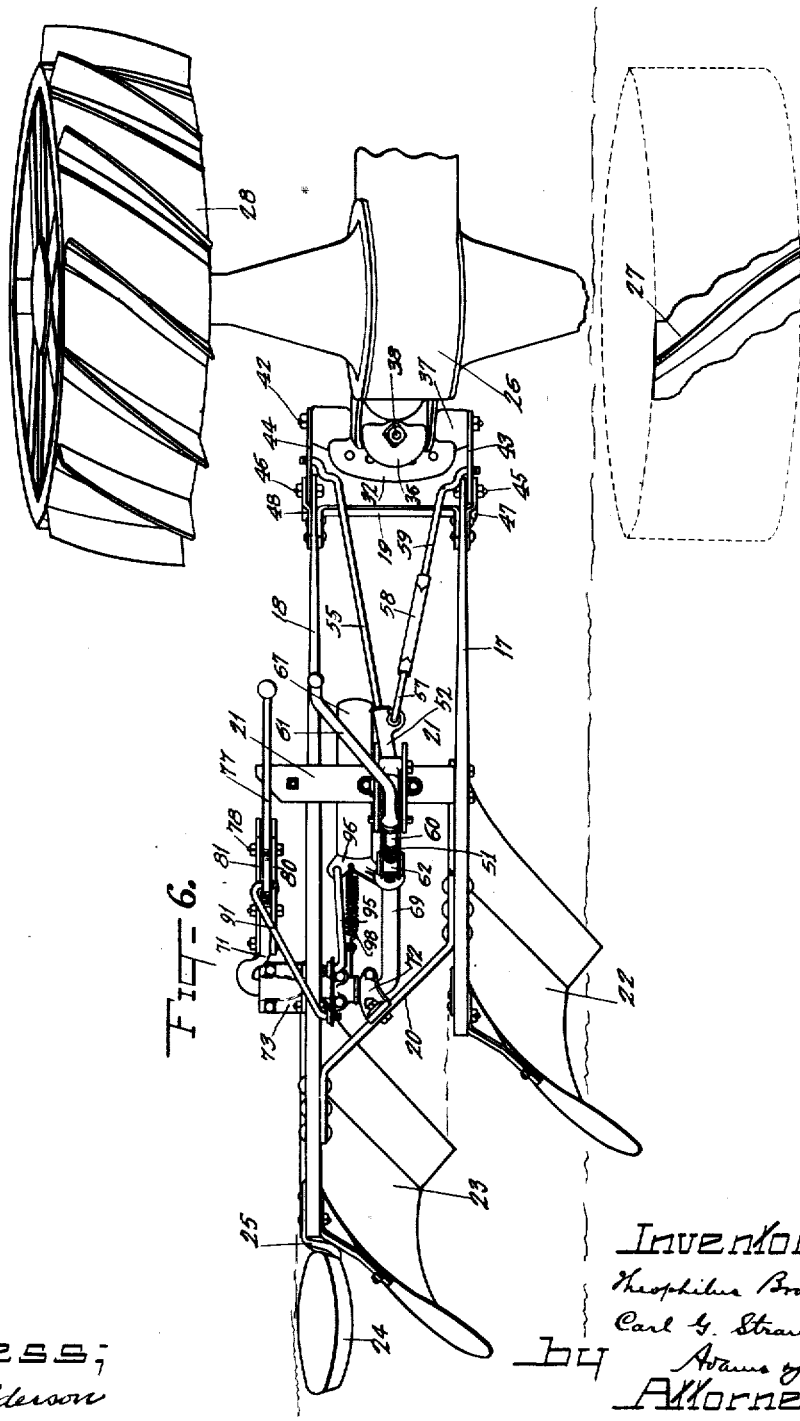

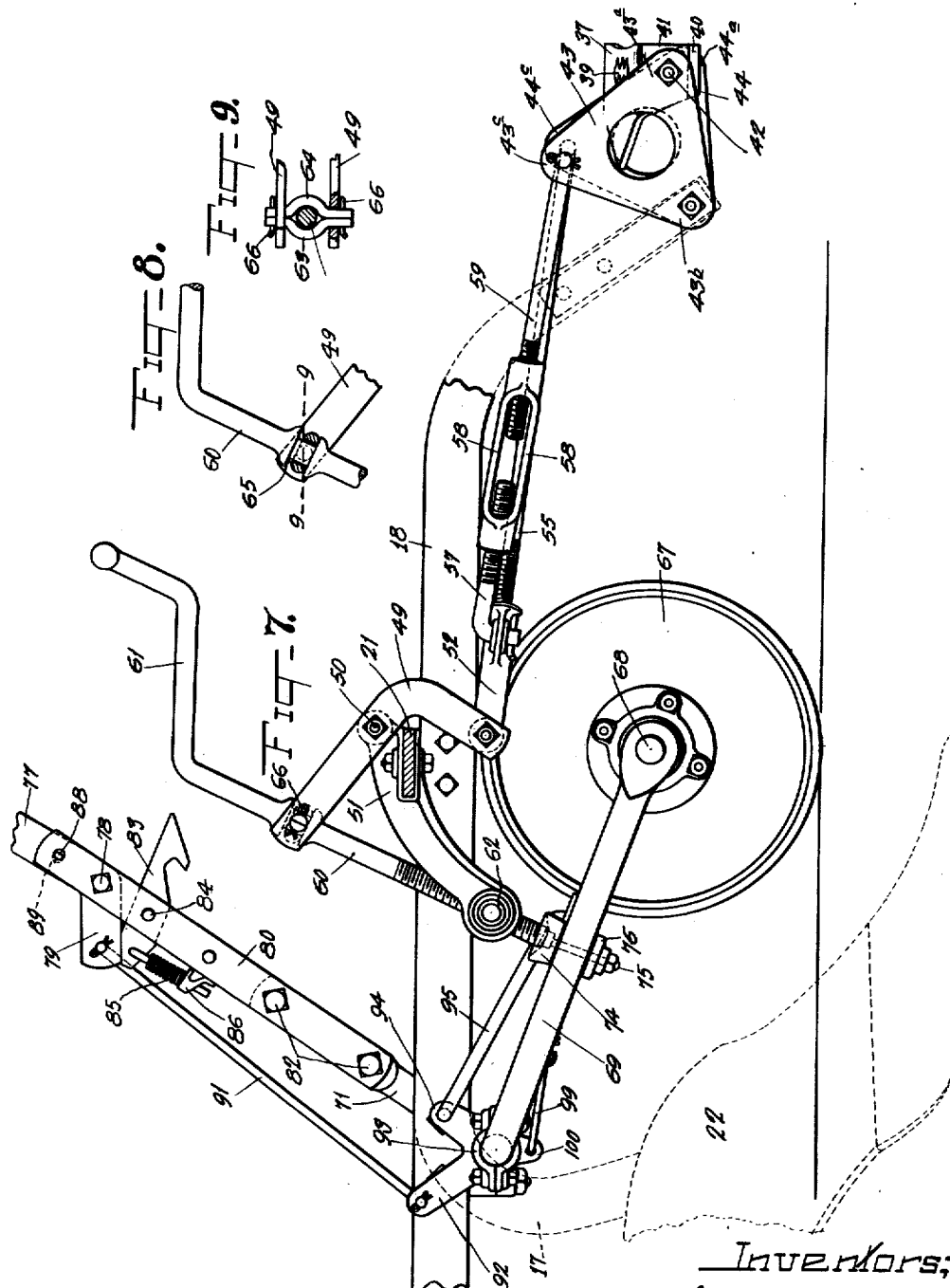

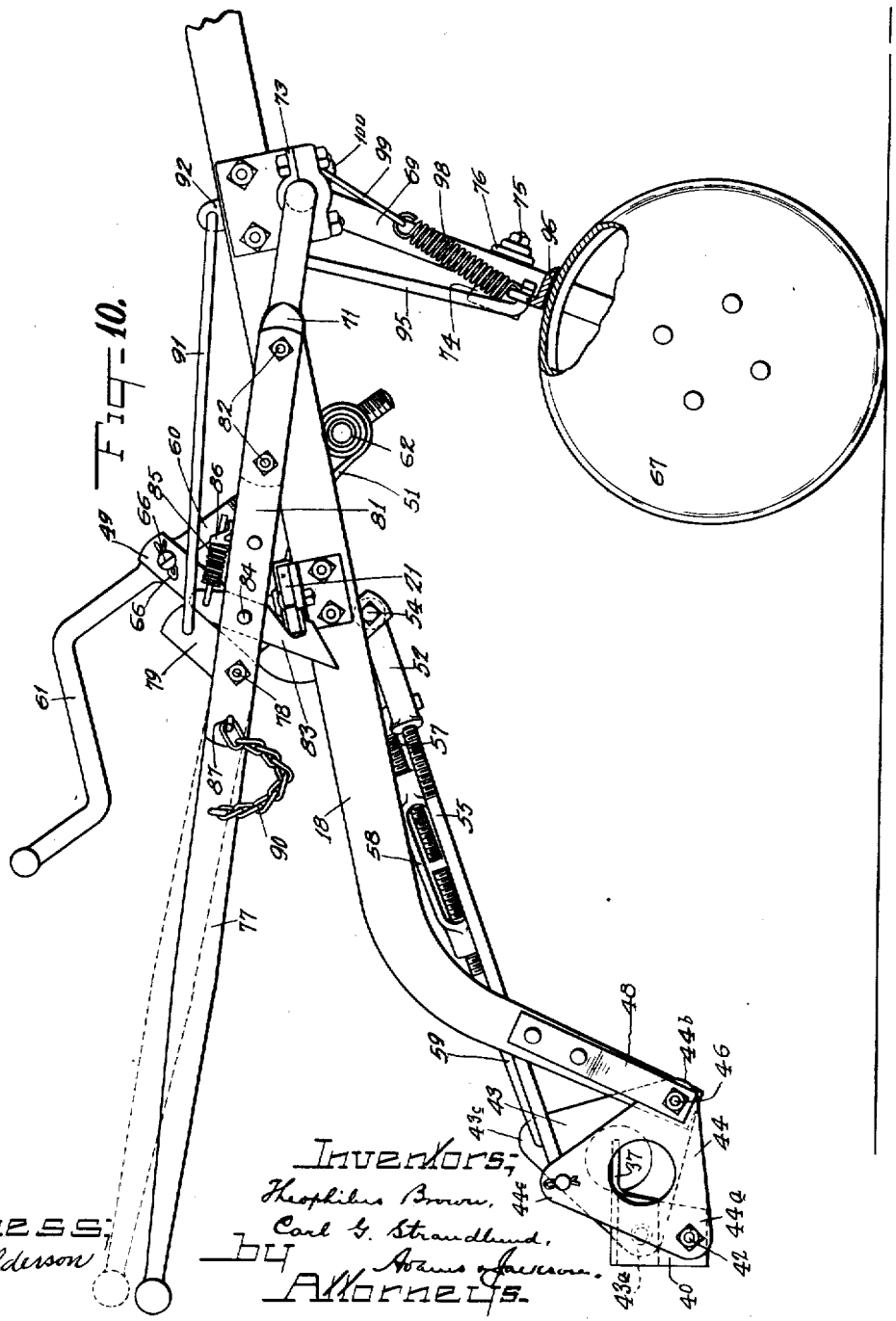

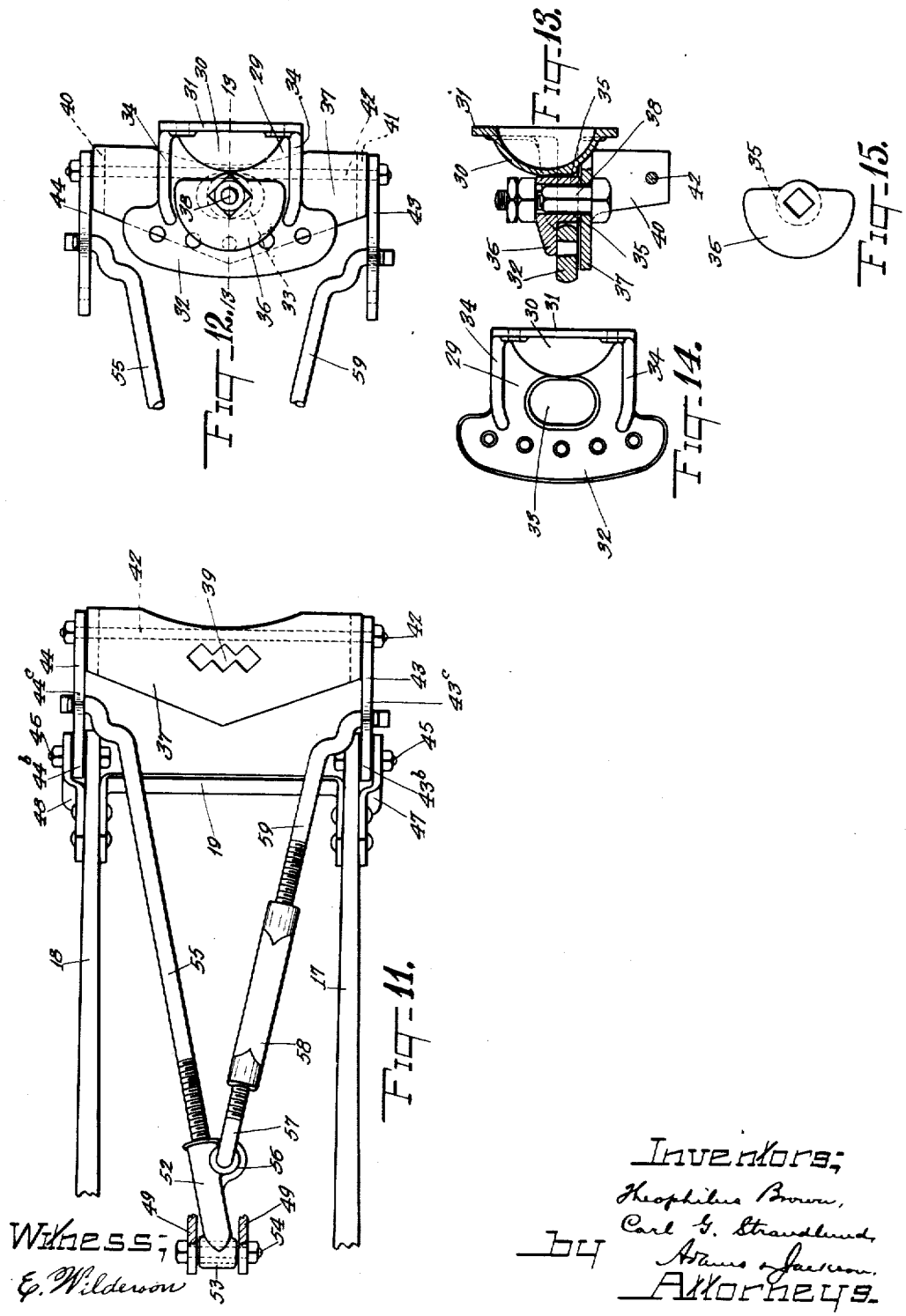

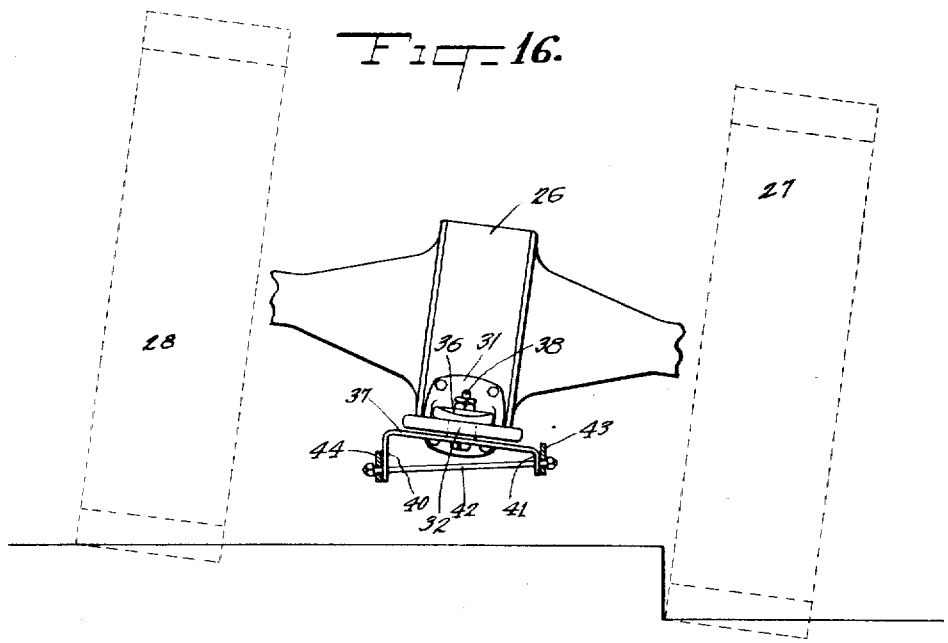

1,745,472

UNITED STATES PATENT OFFICE

THEOPHILUS BROWN AND CARL G. STRANDLUND, OF MOLINE, ILLINOIS, ASSIGNORS TO DEERE & COMPANY, OF MOLINE, ILLINOIS, A CORPORATION OF ILLINOIS

TRACTOR PLOW

Application filed January 28, 1924. Serial No. 689,029.

Our invention relates to plows of the tractor drawn type, and, generally speaking, it has for its object to provide a close coupled plow which will handle easily for transportation and in small fenced fields, so that the plow can be used in plowing in close quarters, such as fence corners, and one that can be backed easily. It also has for its object to provide a power lift plow that can readily be raised or lowered out of or into operative position by the tractor operator without leaving his seat, and one that will be simple in construction, relatively of light weight, and that will be provided with means for leveling the plow or plows, and for regulating the depth of plowing, and incidentally suitably adjusting the hitch point between the plow and the tractor so that the plow will operate properly at whatever depth at which it may be adjusted to run. Other improved features which need not be mentioned at this time will be pointed out in the course of the description of the embodiment of our invention shown in the accompanying drawings, which it will be understood illustrate one only of the various forms in which our improvements may be applied. What we regard as new will be set forth in the claims.

In the accompanying drawings,—

Fig. 1 is a side elevation of our improved plow, the rear portion only of the tractor being shown. In this view the plow is in its elevated or inoperative position;

Fig. 2 is a detail illustrating the depth limiting and plow lifting wheel with some of the parts associated therewith, a portion of the rim of the wheel being shown in section;

Fig. 3 is a detail, being a partial plan view illustrating a part of the bail or axle by which the lifting wheel is carried and on which also the lifting lever is mounted, some parts of the plow being shown in dotted lines;

Fig. 4 is a side elevation of our improved plow showing the plow bottoms in operative position, part of one of the rear wheels of the tractor being broken away to better illustrate the hitching devices by which the plow is connected with the tractor;

Fig. 5 is a partial plan view illustrating the arrangement of the devices that cooperate with the lifting wheel to limit the depth of plowing;

Fig. 6 is a plan view of our improved plow, all but the rear wheels of the tractor and the rear portion of the frame thereof being omitted, and one of the rear wheels being shown principally in dotted lines;

Fig. 7 is an enlarged detail, being a partial side elevation with one of the plow beams removed to better show the arrangement of the lifting, depth limiting and leveling devices, and also the adjustable hitch connections;

Fig. 8 is a detail illustrating certain parts of the depth limiting and hitch adjusting devices;

Fig. 9 is also a detail, being approximately a section on line 9—9 of Fig. 8;

Fig. 10 is a reversed view of the parts shown in Fig. 7 illustrating their position when the plow is lifted out of its operative position;

Fig. 11 is a partial plan view illustrating more in detail the devices for leveling the plows and some of the hitch connections;

Fig. 12 is also a partial plan view showing the hitch connections and the draft attachments assembled;

Fig. 13 is a vertical section on line 13—13 of Fig. 12;

Fig. 14 is a plan view of the draw-bar which is rigidly connected with the tractor frame and projects rearwardly therefrom, with which draw-bar the plow is connected;

Fig. 15 is a plan view of one of the draft connections shown in Figs. 12 and 13; and Fig. 16 is a rear elevation of the central portion of the tractor frame showing the draft connections, the rear wheels of the tractor being indicated by dotted lines.

Our improved plow is designed to be coupled directly to the frame, or rear axle housing, of a tractor provided with a rearwardly projecting draw-bar rigidly secured to said housing, and it is desirable that the connection between the plow beam or beams and said draw-bar be such that the plows will be capable of swinging laterally to a limited extent so that they will not interfere with the proper steering of the tractor, as would be the case if they were held against all lateral swinging. The plows must also be capable of swinging vertically into or out of operative position, and of rocking to a limited extent about a longitudinal axis to compensate for the transverse tilting of the tractor, owing to the fact that the wheels of one side thereof run in the furrow and those at the other side on the land, so that the plow bottoms will run level. It is also important to provide means for vertically adjusting the hitch point at the front end of the plow when the depth of plowing is changed so that the plow bottoms will run properly at the depth to which they may be adjusted. The manner in which these several desirable results are obtained will not be described.

By reference to Fig. 6, it will be seen that for the purposes of this specification we have chosen to show our improvements applied to a two bottom gang plow of the so-called frameless type, i. e. one in which there is no frame other than that formed by the plow beams, which are rigidly braced together in parallel relation to each other and at the proper distance apart so that the plow bottoms plow consecutive furrows. The number of plow bottoms used is, of course, optional. As shown in the drawings, 17, 18 indicate the plow beams, which are connected together at the front by a U-shaped brace 19 and at the rear by a diagonal brace 20. A transversely-disposed plate 21 serves not only as an intermediate brace, but also performs certain other functions which will be hereinafter pointed out. 22, 23 indicate the two plow bottoms, and 24 indicates a rear furrow wheel or rolling landside which is carried by a bracket 25 secured to and projecting rearwardly from the beam 18. The rear axle housing or frame of the tractor is shown at 26, and 27, 28 indicate the rear wheels of the tractor, of which 27 is the furrow wheel and 28 the land wheel. Secured to the rear portion of the tractor frame 26 is a draw-bar 29, the forward portion of which is hemi-spherical in shape, as shown at 30 in Fig. 13, for the purpose of receiving the rear end of a drive shaft carrying a worm by which power is communicated to the rear axle member of the tractor. The member 30 is provided with a marginal flange 31 by which it is bolted to the frame 26 so that it is held rigidly in position. Extending rearwardly from the member 30 is a horizontally-disposed plate 32 having a centrally disposed hole 33, and at opposite sides of said hole are reinforcing webs 34, as shown in Figs. 12 and 14. Fitted in the hole 33 is a draft connection in the form of a sleeve 35, at the upper end of which is a semi-circular plate 36, preferably formed integral therewith, which extends laterally and rearwardly over a portion of the plate 32, as best shown in Figs. 12 and 13, so that the draft member 35 is supported by the draw-bar 29 and is free to rock about a vertical axis in the hole 33. The end portions of the plate 36 serve to limit the extent to which the draft member 35 may so rock, since when said draft member is rocked one end portion or the other of said plate is adapted to engage and be stopped by the member 30 when the predetermined limit is reached.

The lower end of the draft member 35 abuts against the upper surface of a transversely disposed plate 37 with which it is connected by a pivot bolt 38, best shown in Fig. 13, said bolt being adapted to fit in one or another of several rectangular openings 39 in the plate 37, as shown in Fig. 11. The plate 37 is pivotally connected with the plow beams, as hereinafter described, to permit said beams to swing vertically about the pivotal connection between said members, and the purpose of the openings 39 is to permit the plate 37 to be shifted endwise relatively to the draw-bar 29 so that the plows may be adjusted laterally to obtain the right width of cut. As shown in Fig. 16, the plate 37 is provided with downturned end portions 40, 41, the end portion 40 at the landward side of the plow being longer than the end portion 41 at the furrowward side, to compensate for the lateral tilting of the tractor owing to the fact that the wheels at one side thereof run in the furrow, as indicated in said figure. Mounted in the downturned end portions 40, 41 is a transverse pivot bolt 42 about which the plow swings vertically when raised or lowered, as hereinafter described, and by making the end portions 40, 41 of different lengths, as described, it is made practicable to mount the bolt 42 so that it will assume a horizontal position, or approximately so, when the tractor plow is in use. The position of the bolt 42 will of course vary to some extent with different depths of plowing.

The plow beams 17, 18 are respectively connected with the draft devices by means of a hitch device, which in the present instance comprises triangular plates 43, 44, as best shown in Figs. 7 and 11, said plates constituting in effect three armed levers, the arms of which are represented by the apices of the triangles. The forward arms 43$^a$, 44$^a$ thereof are pivotally mounted on the bolt 42 so that the plates 43, 44 may swing vertically about said bolt. The rearward arms 43$^b$, 44$^b$ of said plates are pivotally connected respectively by bolts 45, 46 with the forward ends of the beams 17, 18, the outer ends of said bolts being braced by straps 47, 48, as shown in Fig. 11. These straps overlap the plates 43, 44 and serve to hold them in parallelism with the vertical planes of the plow beams. The uppermost arms 43$^c$, 44$^c$ of the plates 43, 44 are connected with the lower arm of a leveling lever 49 which is pivoted to swing fore and aft in a vertical plane upon a pivot 50 carried by a bracket 51 secured to the transverse plate 21, as shown in Fig. 7. The lever 49 is preferably made of two parallel bars spaced apart and of bell-crank shape, as shown in Fig. 7, and said lever is connected with the plates 43, 44 by means of a coupling 52 having a boss 53 at its rear end which fits between the members of the lever 49, as shown in Fig. 11, and is connected thereto by a pivot 54. The opposite end of the coupling 52 is internally screw threaded to receive the threaded rear end of a connecting rod 55, the forward end of which is pivotally connected with the arm 44° of the plate 44, as best shown in Figs. 11 and 12. At one side of the coupling 52 adjacent to its forward end is a boss 56 having an eye which receives the hooked rear end of a rod 57, the forward end of which is threaded to enter a turn buckle 58 by which it is connected to a rod 59 which at its forward end is pivotally connected with the arm 43° of the plate 43, as shown in Figs. 7 and 11. The members 57, 58 and 59, therefore, constitute an extensible connecting rod which connects the coupling 52 with the plate 43. As the lever 49 is located approximately midway between the beams 17, 18, as shown in Figs. 6 and 11, the connecting rods between said lever and plates 43, 44 diverge forwardly, and it will be apparent that by means of the turn buckle 58 the length of the connecting rod between the coupling 52 and the plate 43 may be varied to rock said plate vertically about the pivot 42, thereby raising or lowering the forward end of the beam 17 relatively to that of the beam 18, and consequently rocking the plows relatively to a longitudinal axis. By this means the plows may be made to run level regardless of the lateral tipping of the tractor. The plates 43, 44 may, however, be swung vertically in unison to raise or lower the hitch point of the plow beams with relation to the pivot 42 which connects said plates with the draft devices by rocking the lever 49 about its fulcrum or pivot 50. For so rocking said lever we employ a shaft 60 arranged in an approximately upright position and provided at its upper end with a crank 61 by means of which it may be rotated, as best shown in Fig. 7. The lower end of said shaft is screw threaded and works in a threaded sleeve 62 journaled in the lower end portion of the bracket 51, which is bifurcated as best shown in Fig. 5, the lower end portions of said bracket being spaced apart to permit the shaft 60 to pass between them. By this arrangement separated bearings are provided for the end portions of the sleeve 62 so that it is firmly supported. The lower end of the shaft 60 serves as an adjustable limit stop to regulate the depth of plowing, as will be hereinafter described. The upper arm of the lever 49 is operatively connected with the shaft 60 by means of a split collar composed of members 63, 64, shown in Fig. 9, the end portions of which are fitted in openings in the upper end portions of the bars composing the lever 49, while the intermediate portions of said members serve as a collar which lies in an annular groove 65 provided in the shaft 60, as shown in Fig. 8. Cotter pins 66 serve to keep the bars of the lever 49 from slipping off the ends of said members.

By this construction when the shaft 60 is rotated by means of the crank 61, it will move longitudinally through the sleeve 62, thereby moving the upper arm of the lever 49 up or down and the lower arm of said lever fore and aft. Forward movement of the latter arm will thrust forward on the arms 43°, 44° of the three armed levers 43, 44, thereby rocking said levers about their pivot 42 and lifting the hitch point of the forward ends of the beams 17, 18. Conversely rearward movement of the lower arm of the lever 49 lowers the hitch point of the front ends of the beams. By means of the shaft 60, therefore, the hitch point may be raised or lowered readily for plowing at different depths. The range of hitch adjustment may be modified if desired by means of the screw threads on the rods 55, 57 and 59, shown in Fig. 11, but ordinarily the adjustment provided for by the shaft 60 and lever 49 suffices.

It will be noted that the hitch is always very low relatively to the tractor so that the effect is to put the weight on the front wheels of the tractor, consequently making steering easier and giving better control, a feature that is especially desirable under heavy operating conditions.

For limiting the depth of plowing, supporting the plow for transportation, and for furnishing power to aid in lifting the plow out of the ground, we provide a wheel 67 mounted on a spindle 68 carried by an arm 69 that extends forward from a transversely disposed rock shaft 70, best shown in Fig. 3. The arm 69 is preferably formed integral with one end of the rock shaft 70, which at its other end is provided with a forwardly and upwardly projecting arm 71. Said rock shaft is journaled in bearings provided in brackets 72, 73 secured respectively to the diagonal brace 20 and the beam 18, as best shown in Fig. 6, and indicated by dotted lines in Fig. 3. As best shown in Figs. 6 and 7, said rock shaft is so arranged that the arm 69 extends under the lower end of the shaft 60, where it is provided with a bearing block 74 suitably secured to it, as by a bolt 75 and clamp plate 76, shown in Fig. 7, which block is adapted to underlie the lower end of the shaft 60 and is preferably provided with a recess to receive the same, as indicated by dotted lines in the latter figure. By this arrangement the shaft 60 forms an adjustable stop which limits the extent to which the arm 69 and wheel 67 may swing upward the plow beams. When the plow is in use the wheel 67 runs on the land, and when the block 74 is in contact with the lower end of the shaft 60 obviously the plow bottoms cannot penetrate the soil more deeply. Therefore, by setting the shaft 60 at any desired point, the wheel 67 operates to hold the plow bottoms from penetrating more deeply than the maximum depth permitted by the shaft 60. As has been explained, adjustment of the shaft 60 to regulate the maximum depth of plowing also adjusts the hitch point vertically, and it will be apparent from an inspection of Fig. 7 that these adjustments are correlated so that automatically when the shaft 60 is moved down, for example, to decrease the depth of plowing, the lever 49 will be rocked about its pivot 50 in a counter-clockwise direction as viewed in said figure, thereby rocking the three armed lever plates 43, 44 in a clockwise direction, and consequently raising the point of hitch of the beams 17, 18 to correspond with the reduced plowing depth. Adjustment of the shaft 60 in the opposite direction to increase the plowing depth lowers the point of hitch by rocking the lever 49 in a clockwise direction as viewed in Fig. 7. By this construction, therefore, the point of hitch is always maintained substantially in the line of draft regardless of the plowing depth, in this respect our present construction being similar, generically, to that of our pending application, Serial No. 371,245, filed April 5, 1920, and the application of Carl G. Strandlund, Serial No. 374,835, filed April 19, 1920. It should be noted that the arm 69 is not positively connected with the hitch controlling devices, but is free to swing toward and away from the lower end of the shaft 60; consequently such controlling devices not only serve to adjust the hitch point to vary the depth of plowing, but also to adjust the plow bodies simultaneously when the plow is in the ground, and permit the tractor to rise and fall independently of the plow, or, conversely, the plow to rise and fall independently of the tractor. Under ordinary operating conditions the wheel 67 to a large extent floats, and there is no material thrust of the lower end of the shaft 60 against the block 74; indeed, these parts may at times be entirely out of contact with each other, but if the plows should tend to run more deeply into the ground than the depth for which the hitch is set, the shaft 60 will then abut against the block 74 and the wheel 67 will hold the plows from penetrating more deeply.

For lifting the plows above the ground for transportation purposes, the rock shaft 70 and the arm 69 function as a bail or crank axle pivoted to swing about the axis 68 of the wheel 67 so that the rock shaft portion 70 thereof is swung upward and forward, thereby lifting the plow beams and plows in the manner shown in Figs. 1 and 10. By then locking the parts in such position the plows will ride on the wheel 67, which then serves as a transporting wheel. When the plows are so lifted, the beams 17, 18, together with the plates 43, 44, swing approximately vertically about the pivot bolt 42, and the hitch adjustments and leveling connections remain unaffected.

For the purpose of raising and lowering the plows, a lever 77 is provided, said lever being fulcrumed at 78 and having a short arm 79 projecting at an angle to the main portion of the lever. The fulcrum 78 is mounted between bars 80, 81 that form extensions of the arm 71, to which they are firmly secured in any suitable way, as by bolts 82 shown in Figs. 4 and 10. Between the bars 80, 81 is also mounted a latch lever 83 mounted between its ends on a pivot 84, as shown in Fig. 10. The latch portion of said lever is so arranged that when the lever 77 is moved downward to approximately the limit of its lifting movement, the latch 83 will hook over the transverse bar 21, thereby holding the plow beams in their raised position. The latch 83 is moved into latching position by means of a spring 85 connected to one end portion of said latch lever, and bearing against a lug 86 secured to the bars 80, 81, as shown in Fig. 10. As also shown in said figure, one edge of the arm 79 of the lever 77 is adapted to bear against the adjacent edge of the latch lever 83, so that by providing for a little lost motion between the lever 77 and the bars 80, 81 said lever may be rocked sufficiently in a clockwise direction as viewed in Fig. 10, to release the latch from the bar 21, thereby permitting the plows to descend. To avoid accidental release of the latch lever 83 when the plow is being transported, provision is made for locking the lever 77 rigidly with relation to the bars 80, 81, the means for this purpose comprising a cotter pin or key 87 which is adapted to be inserted in holes 88, 89 in the upper end portions of the bars 80, 81 and in the lower portion of the lever 77, respectively, when said lever is in alinement with said bars. Therefore, by inserting the key 87 in said holes, the lever 77 cannot be actuated to release the latch. The key 87 is preferably attached to the bar 81 by a chain 90 so that it will not be lost.

In order to make use of the draft of the tractor as an aid in lifting the plows into transporting position, the arm 79 of the lever 77 is connected by a rod 91 with an arm 92 carried by a sleeve 93 loosely mounted on the rock-shaft 70, as shown in Figs. 3 and 7. Said sleeve is also provided with an arm 94 which is connected by a rod 95 with the free end portion of a brake shoe 96 which is pivoted at 97 on the arm 69, as best shown in Fig. 2. Said brake shoe is so placed that it may be swung into and out of engagement with the periphery of the wheel 67 by rocking the sleeve 93, but it is normally held out of engagement with said wheel by a spring 98 connected by a rod 99 with an arm 100 also carried by the sleeve 93, as shown in Fig. 7. The arrangement of these parts is such that by moving forward the upper end of the lever 77 it will rock on its fulcrum 78. Consequently through the arm 79 of said lever, the connecting rod 91 and the rod 92 of the sleeve 93, said sleeve will be rocked in a clockwise direction as viewed in Fig. 7. This will cause the brake shoe 96 to be applied to the wheel through the thrust transmitted by means of the rod 95, and consequently the braking of the wheel will make the force of the draft effective to lift the plows, since the draft will tend to swing the arm 69 in a clockwise direction about the axis 68 of the wheel 67. At the same time the manual force applied to the lever 77 will also tend to swing the arm 69 in the same direction, and consequently will aid in lifting the plows. By this means the arm 69 will be swung to the position shown in Fig. 10, whereupon the latch 83 will engage the bar 21 and the plows be thereby held up, and supported in transporting position by said wheel. By then locking the lever 77 in alinement with the bars 80, 81 by means of the key 87, as above described, not only is accidental release of the latch 83 prevented, but also the brake 96 is relieved of the brake applying influence of the weight of the lever 77 so that it does not drag on the wheel. This feature of providing for the co-operation of manual and power actuated lifting means for the plows is an important part of our invention, as it facilitates the lifting operation and makes it unnecessary to provide more elaborate power operated lifting mechanism capable in itself of performing the entire work of lifting. It is evident that in the arrangement shown the greatest exertion of power is necessary at the beginning of the lifting operation, at which time the lever 77 is in its most favorable position not only to apply the brake, but also to function as a lever for lifting purposes. As the beams rise, the angle between the arm 69 and the beams becomes greater, and consequently the draft of the tractor is applied under more favorable conditions, so that less assistance from the direct action of the lever 77 is needed as the position of said lever becomes less favorable. The plows, therefore, are lifted smoothly, and to a large extent by the draft of the tractor, so that the lifting operation can be performed without difficulty by an operator in the driver's seat. It is not necessary that the wheel be locked against rotation in order to lift the plows, but only that it be braked sufficiently to enable the draft of the tractor, aided by such manual effort as the operator may employ, to swing the arm 69 to its elevated position. To lower the plows it is necessary only to withdraw the key 87 and then swing the lever 77 to the position shown in dotted lines in Fig. 10, which will release the latch 83, whereupon the plows will descend of their own weight.

It will be noted that when the sleeve 93 is rocked to apply the brake to the wheel 67, the arm 100 carried by said sleeve with which the rear end of the spring 98 is connected is moved backward, while at the same time the brake shoe 96 is moved forward by means of the rod 95. Consequently tension is applied to both ends of the spring, thereby giving quicker action in releasing the brake. Also by mounting the spring in this manner it does not work against the latch lever 83, since when the plows are being lifted the arm 79 of the lever 77, with which the spring 98 is connected through the sleeve 93 and connecting rod 91, is then moved away from the latch lever 83, permitting such latch lever to move into operative position under the influence of the spring 85.

By the construction described, we have provided a tractor plow in which the plow proper is hitched directly to the tractor frame, so that the parts are closely coupled and the advantages of a low down hitch are realized. While the plow is free to swing laterally, so that steering of the tractor is not interfered with, the wide bearing surfaces provided by the transverse plate 37 and the wide draw-bar 32 co-act to prevent transverse tilting of the plow about a longitudinal axis when in operation, although such transverse tilting may be separately effected to level the plow by means of the leveling devices described. For plowing at different depths the point of hitch may readily be adjusted vertically, within the limits permitted by the range of movement of the lever 49, by means of the crank 61, and the depth limiting stop be at the same time correspondingly adjusted. The rocking movement of the lever 49 in either direction is limited by the transverse plate 21. The width of cut may be varied by adjusting laterally the point of connection of the draft devices with the plate 37, so that the plow is well adapted for hillside work. When the plow is to be raised above the ground for transportation purposes, this is easily accomplished by the power of the tractor, aided by the manual effort of the operator, as above described, and it is then supported by the wheel 67 on which it rides while being transported from place to place. We thus provide a comparatively light weight, compact plow which is very easily operated and is especially adapted for work in confined spaces, such as small fenced fields, and as the plow is positively held against lateral swinging beyond predetermined limits, it may easily be backed whenever and to such extent as may be necessary.

It will be understood that in describing in detail the specific form in which we have embodied our invention as illustrated in the accompanying drawings, we have not intended by so doing to limit our invention to the specific construction shown and described, except in so far as such specific construction may be particularly claimed, as in various respects our invention is generic in character, and the claims hereinafter made are therefore to be construed accordingly.

The mechanism for lifting the plow and the devices for controlling the depth of plowing, considered apart from the hitch connections and leveling devices, are not herein claimed, as a separate application therefor will be filed.

What we claim as our invention and desire to secure by Letters Patent, is—

1. In a plow including a draft element, the combination of a beam, a furrow opener carried thereby, a ground engaging wheel, vertically swinging means supporting the beam on said wheel, adjustable depth limiting means cooperating with said supporting means to limit the depth of plowing, said supporting means being movable relatively to said depth limiting means, a hitch device pivotally connecting the forward end of the beam with the draft element and vertically adjustable to vary the depth of plowing, and means for effecting simultaneously adjustment of said depth limiting means and said hitch device.

2. In a plow including a draft element, the combination of a beam, a furrow opener carried thereby, a ground engaging wheel, vertically swinging means supporting the beam on said wheel, adjustable depth limiting means cooperating with said supporting means to limit the depth of plowing, said supporting means being movable relatively to said depth limiting means, a hitch device pivotally connected with the forward end of the beam and with the draft element and adapted to swing vertically to vary the depth of plowing, and means for effecting simultaneous adjustment of said depth limiting means and said hitch device.

3. In a plow including a draft element, the combination of a beam, a furrow opener carried thereby, a ground engaging wheel, a vertically swinging axle supporting the beam on said wheel, adjustable depth limiting means cooperating with said axle to limit the depth of plowing, said axle being movable relatively to said depth limiting means, a hitch device pivotally connecting the forward end of the beam with the draft element and vertically adjustable to vary the depth of plowing, a lever actuated by the adjustment of said depth limiting means, and means actuated by said lever for adjusting said hitch device.

4. In a plow including a draft element, the combination of a beam, a furrow opener carried thereby, a ground engaging wheel, a vertically swinging axle supporting the beam on said wheel, adjustable depth limiting means cooperating with said axle to limit the depth of plowing, said axle being movable relatively to said depth limiting means, a vertically swinging hitch device pivotally connected with the forward end of the beam and with the draft element, and adjustable to vary the depth of plowing, a lever actuated by the adjustment of said depth limiting means and means connecting said lever with said hitch device for adjusting the latter by the operation of said lever.

5. A plow comprising a plow beam, a ground wheel, a vertically swinging axle connecting the beam with the wheel and pivoted to swing about the axis of said wheel, for supporting the plow when it is in its elevated position, an adjustable stop cooperating with said axle for limiting the depth of plowing, means for swinging said axle to lift the plow above the ground, a hitch member connected with the front portion of the beam and adjustable to raise or lower the hitch point, and means actuated by the adjustment of said stop for correspondingly adjusting said hitch member.

6. A plow comprising a plow beam, a ground wheel, a vertically swinging axle connecting the beam with the wheel and pivoted to swing about the axis of said wheel, for supporting the plow when it is in its elevated position, an adjustable stop mounted on the beam and cooperating with said axle for limiting the depth of plowing, means for swinging said axle to lift the plow above the ground, a hitch member connected with the front portion of the beam and adjustable to raise or lower the hitch point, and means actuated by the adjustment of said stop for correspondingly adjusting said hitch member.

7. A plow comprising a plow beam, a ground wheel, a vertically swinging axle connecting the beam with the wheel and pivoted to swing about the axis of said wheel, for supporting the plow when it is in its elevated position, an adjustable stop in the form of a screw-threaded shaft mounted on the beam and cooperating with said axle for limiting the depth of plowing, means for swinging said axle to lift the plow above the ground, a hitch member connected with the front portion of the beam and adjustable to raise or lower the hitch point, and means actuated by the adjustment of said stop for correspondingly adjusting said hitch member.

8. A plow comprising a plow beam, a ground wheel, a vertically swinging axle connecting the beam with the wheel and pivoted to swing about the axis of said wheel, for supporting the plow when it is in its elevated position, an adjustable stop mounted on the beam and cooperating with said axle for limiting the depth of plowing, means for swinging said axle to lift the plow above the ground, a hitch member connected with the front portion of the beam and adjustable to raise or lower the hitch point, and a lever mounted on the beam and actuated by the adjustment of said stop for correspondingly adjusting said hitch member.

9. A plow comprising a plow beam, a ground wheel, a vertically swinging axle connecting the beam with the wheel and pivoted to swing about the axis of said wheel, for supporting the plow when it is in its elevated position, an adjustable stop in the form of a screw-threaded shaft mounted on the beam and cooperating with said axle for limiting the depth of plowing, means for swinging said axle to lift the plow above the ground, a hitch member connected with the front portion of the beam and adjustable to raise or lower the hitch point, and a lever mounted on the beam and actuated by the adjustment of said stop for correspondingly adjusting said hitch member.

10. A plow comprising a plow beam, a ground wheel, a vertically swinging axle connecting the beam with the wheel and pivoted to swing about the axis of said wheel, for supporting the plow when it is in its elevated position, an adjustable stop cooperating with said axle for limiting the depth of plowing, means for swinging said axle to lift the plow above the ground, a hitch member in the form of a three-armed lever having one of its arms connected with the draft means and another with the forward portion of the beam, a lever mounted on the beam and arranged to be rocked by the adjustment of said stop, and means connecting said lever with the third arm of said hitch member whereby said hitch member will be correspondingly adjusted when said stop is adjusted.

11. The combination with a tractor, of a hitch device comprising parallel members, means pivotally connecting said members with the tractor to swing laterally, a plow having a beam connected with said hitch device, a ground wheel, a vertically swinging axle journaled on the beam and pivoted to swing about the axis of the ground wheel to support the plow on said wheel clear of the ground when it is in transport position, means for adjusting said hitch device to level the plow, and means for swinging said axle to lift the plow on said ground wheel clear of the ground.

12. The combination with a tractor, of a hitch device comprising parallel members, means pivotally connecting said members with the tractor to swing laterally, means for holding said members against lateral tilting with relation to the tractor, a plow having a beam connected with said hitch members, a ground wheel, a vertically swinging axle journaled on the beam and pivoted to swing about the axis of the ground wheel to support the plow on said wheel clear of the ground when it is in transport position, means for swinging said axle to lift the plow on said wheel clear of the ground, and means for adjusting said hitch members relatively to each other to level the plow.

13. The combination with a tractor, of a hitch device comprising laterally spaced members, means pivotally connecting said members with the tractor to swing vertically and laterally, a plow having a beam connected with said hitch members, a ground wheel, a vertically swinging axle journaled on the beam and pivoted to swing about the axis of the ground wheel to support the plow clear of the ground on said wheel when it is in transport position, means for adjusting said hitch device to level the plow, and means for swinging said axle to lift the plow on said wheel clear of the ground.

14. The combination with a tractor, of a hitch device comprising laterally spaced members, means pivotally connecting said members with the tractor to swing vertically and laterally, means for holding said members against lateral tilting with relation to the tractor, a plow having a beam connected with said hitch members, a ground wheel, a vertically swinging axle journaled on the beam and pivoted to swing about the axis of said wheel to support the plow on ground wheel clear of the ground when it is in transport position, means for swinging said axle to lift the plow on said wheel, and means for adjusting said hitch members relatively to each other to level the plow.

15. The combination with a tractor, of a plow comprising a plurality of parallel laterally spaced plow beams rigidly connected together, a ground wheel, a vertically swinging axle journaled on said beams and pivoted to swing about the axis of the ground wheel to support the plow on said wheel clear of the ground when it is in transport position, a hitch device comprising laterally spaced members connecting said beams with the tractor, screw means operable to adjust said hitch device to level the plow, means pivotally connecting said hitch device with the tractor to swing vertically and laterally with relation thereto, and means for swinging said axle to lift the plow on said ground wheel.

16. The combination with a tractor, of a plow comprising a plurality of parallel laterally spaced plow beams rigidly connected together, a ground wheel, a vertically swinging axle journaled on said beams and pivoted to swing about the axis of the ground wheel to support the plow on said wheel clear of the ground when it is in transport position, a hitch device comprising laterally spaced members connecting the beams with the tractor, means connecting said beams with said members, and operable to adjust said members relatively to each other to level the plow, means connecting said hitch device with the tractor to swing vertically and laterally with relation thereto, means for holding the hitch device against lateral tilting, and means for swinging said axle to lift the plow on said ground wheel.

17. The combination with a tractor, of a plow comprising a plurality of parallel laterally spaced plow beams rigidly connected together, a ground wheel disposed substantially in the longitudinal median plane of the implement, a vertically swinging axle journaled on said beams and pivoted to swing about the axis of the ground wheel to support the plow on said wheel clear of the ground when it is in transport position, a hitch device, comprising levers vertically adjustable relatively to each other, connecting said plow beams with the tractor, means pivotally connecting said hitch device with the tractor to swing vertically and laterally, means for adjusting said hitch levers vertically relatively to each other to level the plow, and means for swinging said axle to lift the plow on said ground wheel.

18. The combination with a tractor, of a plow comprising a plurality of parallel laterally spaced plow beams rigidly connected together, a ground wheel, a vertically swinging axle journaled on said beams and pivoted to swing about the axis of the ground wheel to support the plow on said wheel clear of the ground when it is in transport position, a hitch device, comprising levers vertically adjustable relatively to each other, connecting said plow beams with the tractor, means pivotally connecting said hitch device with the tractor to swing vertically and laterally, means for adjusting said hitch levers vertically relatively to each other to level the plow, means for holding said hitch device against lateral tilting relatively to the tractor, and means for swinging said axle to lift the plow on said ground wheel.

19. The combination with a tractor, of a plow comprising a plurality of parallel laterally spaced plow beams rigidly connected together, a ground wheel, a vertically swinging axle journaled on said beams and pivoted to swing about the axis of the ground wheel to support the plow on said wheel clear of the ground when it is in transport position, a hitch device comprising three-armed levers connected respectively with said beams, means pivotally connecting said levers with the tractor to swing vertically and laterally, means mounted on said beams for swinging said hitch device vertically to raise or lower the front ends of said beams, means for adjusting said three-armed levers relatively to each other to level the plow, and means for swinging said axle to lift the plow on said ground wheel.

20. The combination with a tractor, of a plow comprising a plurality of parallel laterally spaced plow beams rigidly connected together, a ground wheel, a vertically swinging axle connecting said beams with said wheel and pivoted to swing about the axis thereof to support the plow clear of the ground on said wheel when it is in its elevated position, a hitch device comprising three-armed levers connected respectively with said beams, means pivotally connecting said levers with the tractor to swing vertically and laterally, a bell-crank lever mounted on the beams, rods connecting said bell-crank lever with said three-armed levers respectively, one of said rods being adjustable relatively to the other to adjust said three-armed levers relatively to each other, means for actuating said bell-crank lever to move said three-armed levers vertically in unison to raise or lower the hitch point of the beams, and means for swinging said axle to lift the plow on said ground wheel.

21. The combination with a tractor, of a plow comprising a plurality of parallel laterally spaced plow beams rigidly connected together, a ground wheel, a vertically swinging axle connecting said beams with said wheel and pivoted to swing about the axis thereof to support the plow clear of the ground on said wheel when it is in its elevated position, a hitch device comprising three-armed levers connected respectively with said beams, means pivotally connecting said levers with the tractor to swing vertically and laterally, a bell-crank lever mounted on the beam, rods connecting said bell-crank lever with said three-armed levers respectively, one of said rods being adjustable relatively to the other to adjust said three-armed levers relatively to each other, means for actuating said bell-crank lever to move said three-armed levers vertically in unison to raise or lower the hitch point of the beams, a screw threaded shaft mounted on the beam for actuating said bell-crank lever, said shaft forming an adjustable stop to limit the depth of plowing, and means for swinging said axle to lift the plow on said ground wheel.

22. The combination with a tractor, of a plow comprising a transverse plate having a laterally extended bearing on the tractor, a vertical pivot connecting said plate with the tractor, a hitch device comprising members pivotally connected with the end portions of said plate to swing vertically, means for swinging said members vertically and holding them in adjusted position, plow beams connected respectively with said members and rigidly connected together, a ground wheel, an axle pivotally connected with said beams and with the axis of said ground wheel to support the plow clear of the ground on said ground wheel when in transport position, and means for swinging said axle to lift the plow on said wheel.

23. The combination with a tractor, of a plow comprising a transverse plate having a laterally extended bearing on the tractor, a vertical pivot connecting said plate with the tractor, a hitch device comprising members connected with the end portions of said plate at different distances from the plane thereof to swing vertically, means for swinging said members and holding them in adjusted position, plow beams connected respectively with said members and rigidly connected together, a ground wheel, an axle connected with said beams and with the axis of said ground wheel to support the plow on said wheel clear of the ground when in transport position, and means for swinging said axle to lift the plow on said wheel.

24. The combination with a tractor, of a plow comprising a transverse plate having a laterally extended bearing on the tractor, a vertical pivot connecting said plate with the tractor, said plate having down-turned end portions, a pivot mounted in the end portions of said plate in an inclined position with respect to the plane of said plate, a hitch device comprising laterally spaced members mounted on said pivot to swing vertically, means for swinging said members vertically and holding them in adjusted position, plow beams connected respectively with said members and rigidly connected together, a ground wheel, an axle connected with said beams and with the axis of said ground wheel to support the plow clear of the ground on said wheel when in transport position, and means for swinging said axle to lift the plow on said wheel.

25. The combination with a tractor, of a plow comprising a transverse plate having a laterally extended bearing on the tractor, a vertical pivot connecting said plate with the tractor, said plate being transversely adjustable with respect to said pivot, a hitch device comprising members pivotally connected with the end portions of said plate to swing vertically, means for swinging said members vertically and holding them in adjusted position, plow beams connected respectively with said members and rigidly connected together, a ground wheel, an axle pivotally connected with said beams and with the axis of said ground wheel to support the plow clear of the ground on said wheel when in transport position, and means for swinging said axle to lift the plow on said wheel.

26. The combination with a tractor, of a draw bar at the rear portion thereof, said draw bar having a vertical opening, a plow comprising a draft member having a sleeve mounted in said opening to turn about a vertical axis and having a flange projecting laterally over said draw bar and forming stops to limit the rotation of said sleeve in said opening, a transverse plate extending under said sleeve and having an extended bearing on the under side of said draw bar, a bolt connecting said plate with said sleeve, a hitch device comprising members pivotally connected with the end portions of said plate to swing vertically, means for swinging said members vertically and holding them in adjusted position, plow beams connected respectively with said members and rigidly connected together, a ground wheel, an axle connected with said beams and with the axis of said ground wheel to support the plow clear of the ground on said wheel when in transport position, and means for swinging said axle to lift the plow on said wheel.

27. The combination with a tractor, of a draw bar at the rear portion thereof, said draw bar having a vertical opening, a plow comprising a draft member having a sleeve mounted in said opening to turn about a vertical axis and having a flange projecting laterally over said draw bar and forming stops to limit the extent of rotation of said sleeve in said opening, a transverse plate extending under said sleeve and having an extended bearing on the under side of said draw bar, a bolt connecting said plate with said sleeve, a hitch device comprising members pivotally connected with the end portions of said plate at different distances from the plane thereof, means for swinging said members vertically and holding them in adjusted position, plow beams connected respectively with said members and rigidly connected together, a ground wheel, an axle connected with said beams and with the axis of said ground wheel to support the plow clear of the ground on said wheel when in transport position, and means for swinging said axle to lift the plow on said wheel.

28. The combination with a tractor, of a draw bar at the rear portion thereof, said draw bar having a central vertical opening, a plow comprising a draft member having a sleeve mounted in said opening to turn about a vertical axis and having a flange projecting laterally over said draw bar and forming stops to limit the extent of rotation of said sleeve in said opening, a transverse plate connected with said sleeve and having an extended bearing on the other side of said draw bar, said plate having down-turned end portions, a pivot mounted in the end portions of said plate in an inclined position with respect to the plane of said plate, a hitch device comprising members mounted on said pivot to swing vertically, means for swinging said members vertically and holding them in adjusted position, plow beams connected respectively with said members and rigidly connected together, a ground wheel, an axle connected with said beams and with the axis of said ground wheel to support the plow clear of the ground on said wheel when in transport position, and means for swinging said axle to lift the plow on said wheel.

29. The combination with a tractor, of a draw bar at the rear portion thereof, said draw bar having a central vertical opening, a plow comprising a draft member having a sleeve mounted in said opening to turn about a vertical axis and having a flange projecting laterally over said draw bar and forming stops to limit the extent of rotation of said sleeve in said opening, a transverse plate extending under said sleeve and having an extended bearing on the under side of said draw bar, a bolt connecting said plate with said sleeve, said plate being transversely adjustable relatively to said sleeve, a hitch device comprising members pivotally connected with the end portions of said plate to swing vertically, means for swinging said members vertically and holding them in adjusted position, plow beams connected respectively with said members and rigidly connected together, a ground wheel, an axle connected with said beam and with the axis of said ground wheel to support the plow clear of the ground on said wheel when in transport position, and means for swinging said axle to lift the plow on said wheel.

THEOPHILUS BROWN.
CARL G. STRANDLUND.

CERTIFICATE OF CORRECTION.

Patent No. 1,745,472.    Granted February 4, 1930, to

THEOPHILUS BROWN ET AL.

It is hereby certified that error appears in the printed specification of the above numbered patent requiring correction as follows: Page 2, line 17, for the word "not" read "now"; page 4, line 2, after the word "upward" insert the word "toward"; page 6, line 35, claim 1, for the word "simultaneously" read "simultaneous"; page 7, line 100, claim 14, strike out the words "said wheel to support the plow on ground" and insert instead "the ground wheel to support the plow on said"; and that the said Letters Patent should be read with these corrections therein that the same may conform to the record of the case in the Patent Office.

Signed and sealed this 18th day of March, A. D. 1930.

(Seal)

M. J. Moore,
Acting Commissioner of Patents.

clear of the ground on said wheel when in transport position, and means for swinging said axle to lift the plow on said wheel.

29. The combination with a tractor, of a draw bar at the rear portion thereof, said draw bar having a central vertical opening, a plow comprising a draft member having a sleeve mounted in said opening to turn about a vertical axis and having a flange projecting laterally over said draw bar and forming stops to limit the extent of rotation of said sleeve in said opening, a transverse plate extending under said sleeve and having an extended bearing on the under side of said draw bar, a bolt connecting said plate with said sleeve, said plate being transversely adjustable relatively to said sleeve, a hitch device comprising members pivotally connected with the end portions of said plate to swing vertically, means for swinging said members vertically and holding them in adjusted position, plow beams connected respectively with said members and rigidly connected together, a ground wheel, an axle connected with said beam and with the axis of said ground wheel to support the plow clear of the ground on said wheel when in transport position, and means for swinging said axle to lift the plow on said wheel.

THEOPHILUS BROWN.
CARL G. STRANDLUND.

CERTIFICATE OF CORRECTION.

Patent No. 1,745,472.   Granted February 4, 1930, to

THEOPHILUS BROWN ET AL.

It is hereby certified that error appears in the printed specification of the above numbered patent requiring correction as follows: Page 2, line 17, for the word "not" read "now"; page 4, line 2, after the word "upward" insert the word "toward"; page 6, line 35, claim 1, for the word "simultaneously" read "simultaneous"; page 7, line 100, claim 14, strike out the words "said wheel to support the plow on ground" and insert instead "the ground wheel to support the plow on said"; and that the said Letters Patent should be read with these corrections therein that the same may conform to the record of the case in the Patent Office.

Signed and sealed this 18th day of March, A. D. 1930.

(Seal)

M. J. Moore,
Acting Commissioner of Patents.